(No Model.)
H. S. McKEE.
PIPE COUPLING.
No. 372,479. Patented Nov. 1, 1887.
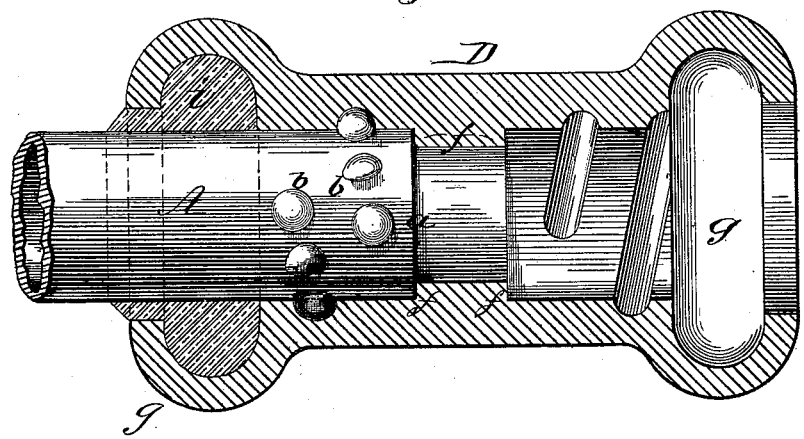
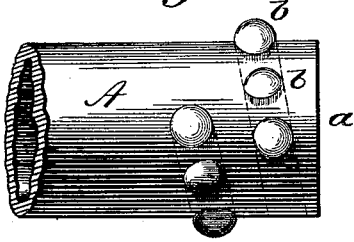
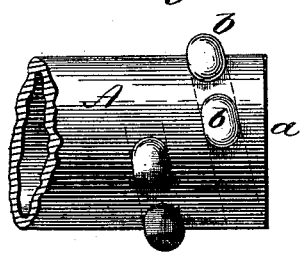
Witnesses:
J. B. McGinn.
A. W. Bright
Inventor,
H. Sellers McKee
by Connolly Bros.
Attys.

UNITED STATES PATENT OFFICE.

H. SELLERS McKEE, OF PITTSBURG, PENNSYLVANIA.

PIPE-COUPLING.

SPECIFICATION forming part of Letters Patent No. 372,479, dated November 1, 1887.

Application filed November 5, 1885. Serial No. 181,592. (No model.)

*To all whom it may concern:*

Be it known that I, H. SELLERS MCKEE, a citizen of the United States, residing at Pittsburg, in the county of Allegheny and State of Pennsylvania, have invented certain new and useful Improvements in Pipe-Couplings for Natural-Gas Mains; and I do hereby declare the following to be a full, clear, and exact description of the invention, reference being had to the accompanying drawings, which form part of this specification.

This invention relates to pipe-couplings of that class which are to be used in joining up the sections of natural-gas pipe-lines, having especial reference to application to wrought-iron pipes of large diameter. As usually constructed, these large pipes have a screw-thread of fine pitch cut on each end, and are coupled by screwing into a similarly threaded sleeve. For very large pipes this threading is very expensive, and the labor and time used in joining the sections are disproportionately great. To overcome merely the friction of the threads requires an enormous amount of labor, and as the pipe must be rotated many times to drive the thread home into the sleeve the expenditure of labor becomes extravagantly excessive. It is not uncommon in a twelve-inch line to use ten men to each side of the pipe-coupling with immense pipe-tongs laboriously straining at the pipes, which advance little by little and slowly into the sleeve. This difficulty, in fact, places a limit to the size of pipe which can be successfully coupled in the way just described.

It has been proposed in some cases where light pipe is used and excessive strength and resistance to end-thrust are not the objective point to form the pipe sections with external lugs and insert them into a coupling-sleeve somewhat after the manner of a bayonet-joint, locking the pipe ends in the sleeve by a slight partial rotation.

My object is to produce a coupling which will require but little effort to use it, will need only a single turn of the pipe-section to set it home in the sleeve, and at the same time be comparatively inexpensive.

To these and other ends my invention consists in a pipe-section having a thread composed of a number of rivet-heads or knobs secured thereto in helical relation, so as to encircle the same, whereby the thread is obtained without weakening or subtracting from the material of the pipe, as is the case where the pipe has the thread cut out of its own body.

My invention still further consists in the combination of such a pipe-section having squared ends with a surrounding sleeve having helical grooves to receive the projecting thread of the pipe, internal shoulders or means for receiving such squared ends, and annular sealing-chambers adapted to receive packing, all substantially as hereinafter described and claimed.

Referring to the annexed drawings, Figure 1 is a longitudinal section of one of the simplest forms of my coupling with pipe in place. Fig. 2 is a view of the pipe alone, with thread of rivet-heads. Fig. 3 is a similar view showing lozenge-shaped rivet-heads.

I take the pipe A and square off its end $a$ and preferably somewhat back of this I fix in the pipe A a helically-arranged row of rivet-heads or other projections, $b$, the successive projections being alike in height and width, as shown, and forming as a whole a single spiral or thread, as before. The rivet-heads $b$ may be round, as in Fig. 2, or they may be lozenge-shaped, as in Fig. 3. The setting of these rivets, as well as punching the holes for them, may be expeditiously accomplished by the use of hydraulic machinery and at a cost below that of chasing the usual threads. The thread or helical row of projections may be right-handed at one end of a pipe-section and left-handed at the other, or both may be alike.

The coupling D, I prefer to make of cast-iron, having the spiral grooves $e$ cored directly therein, and having the central annular rib or double shoulder, $f$, whose faces may be advantageously trued up in a lathe. Coupling D at each end is formed with the annular chamber $g$, for the purpose of receiving and retaining the packing and sealing material used after the pipes are in place.

In coupling pipes by my invention I insert the pipe ends through the overhanging chambers $g$, and simply turn the pipe one revolution, which brings the projecting ends $a$ to bear against the shoulders $f$. This operation is quickly and easily performed, even on the largest sizes of pipe, since the friction is insignificant and but a single turn is required.

Having both pipe ends home against their respective shoulders $f$, I clamp a retaining-band or plaster up clay so as to temporarily close the space between the pipes A and the overhung edges of the chambers $g$, leaving a pouring hole at the top in the usual manner. I then pour in molten lead, $i$, or other metal or material capable of "setting" until no more can be added. After the whole mass has set, the clamps or bands are removed and the lead or other material may be further tightened by calking, if desired. The body of metal in the pipe ends remains the same thickness as when made, and is therefore not weakened, as is the case where the threads are cut in the usual manner directly on the pipe itself. Again, the shoulders $f$ may be omitted and the pipe ends $a$ permitted to come into contact and abut against each other.

I am aware that it is not new to form the screw-thread on a pipe or conduit of discontinuous sections or lugs, the same being integral with the pipe, and I am also aware that a rivet has been used as the stud or stop of a lock-joint applied to a pipe-coupling, and hence I do not claim either of these devices as my invention, the essence of which is a spiral screw-thread formed of a number of rivets or rivet-heads having the functions and special advantages hereinbefore set forth.

I claim as my invention—

1. A pipe-section having a thread composed of a number of rivet-heads arranged in helical relation and forming one or more convolutions around the pipe, substantially as described.

2. The pipe-coupling consisting of the cast-metal sleeve having helical grooves cored therein and sealing-chambers, in combination with the pipe-sections having each a thread composed of a series of rivet-heads or knobs applied to the pipe, substantially as described.

In testimony that I claim the foregoing I have hereunto set my hand this 3d day of November, 1885.

H. SELLERS McKEE.

Witnesses:
T. J. McTIGHE,
JOSHUA RHODES.